Dec. 25, 1945.   J. F. HAINES ET AL   2,391,699
PROPELLER CONTROL MECHANISM
Filed Aug. 26, 1942   5 Sheets-Sheet 1

INVENTORS
JOHN F. HAINES
AND THOMAS B. MARTIN
BY
Spencer, Hardman & Feh,
Their ATTORNEYS

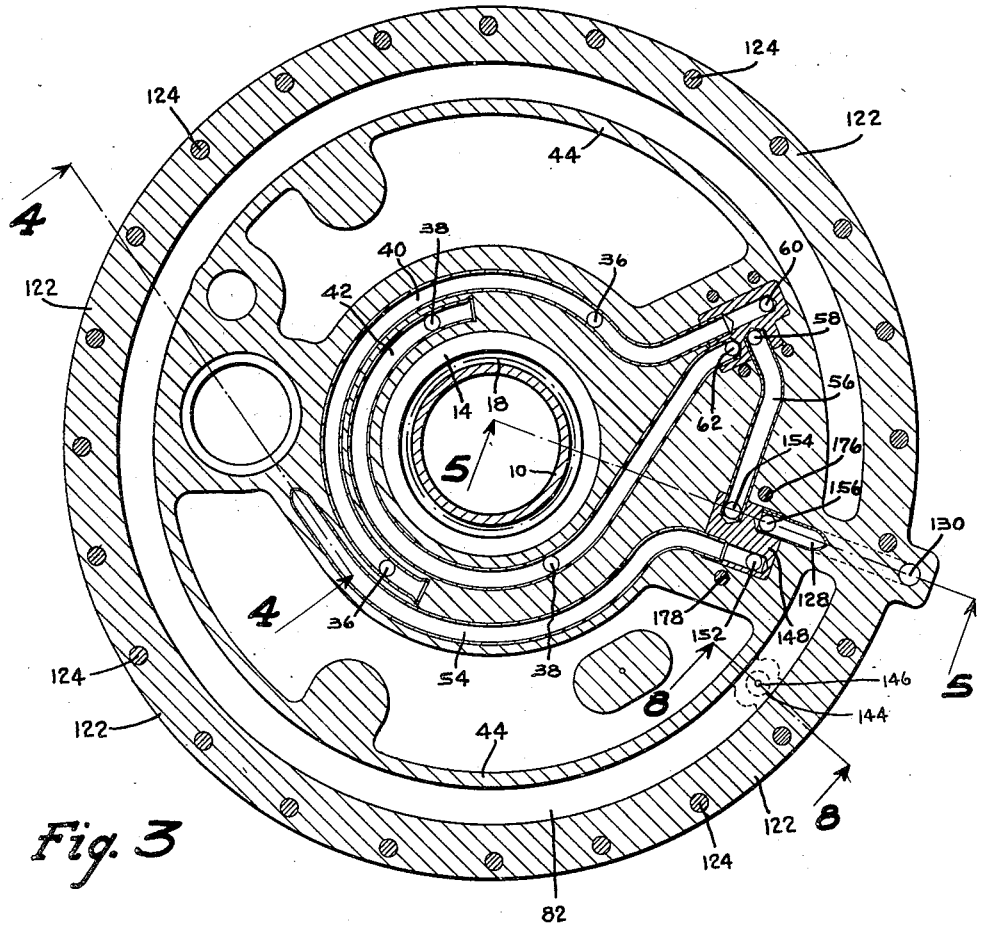
Fig. 3
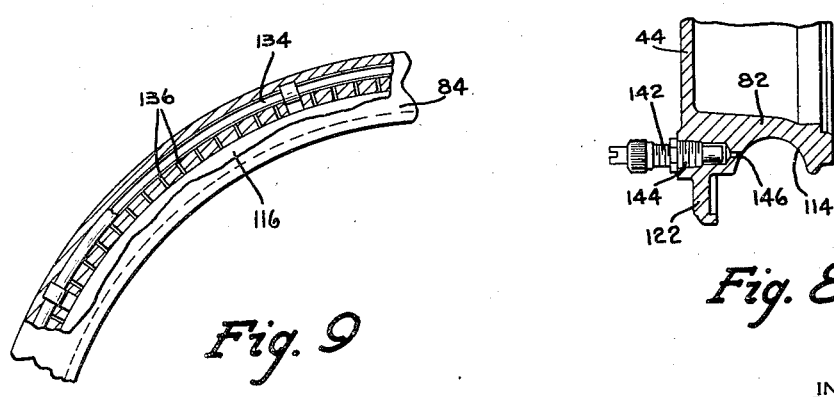
Fig. 9
Fig. 8

Dec. 25, 1945. J. F. HAINES ET AL 2,391,699
PROPELLER CONTROL MECHANISM
Filed Aug. 26, 1942 5 Sheets-Sheet 4

INVENTORS
JOHN F. HAINES
AND THOMAS B. MARTIN
BY Spencer, Hardman & Fehr
Their ATTORNEYS Dec. 25, 1945.  J. F. HAINES ET AL  2,391,699
PROPELLER CONTROL MECHANISM
Filed Aug. 26, 1942   5 Sheets-Sheet 5

PLANE OF ROTATION

FEATHERED    HIGH ANGLE    LOW ANGLE

INVENTORS
JOHN F. HAINES
AND THOMAS B. MARTIN
BY
*Spencer Hardman & Fehr*
Their ATTORNEYS Patented Dec. 25, 1945

2,391,699

UNITED STATES PATENT OFFICE 2,391,699

PROPELLER CONTROL MECHANISM

John F. Haines and Thomas B. Martin, Dayton, Ohio, assignors to General Motors Corporation, Detroit, Mich., a corporation of Delaware Application August 26, 1942, Serial No. 456,225

18 Claims. (Cl. 170—163)

This invention relates to the shift of propeller blades to an extreme position outside of the usual range of pitch for controllable pitch propellers, and has for an object to provide a reserve of energy available for shifting the blades into an extreme position and back to the normal range without regeneration of the reserve energy.

Another object is to provide means in conjunction with an hydraulic control circuit adapted for normal pitch change for effecting the extreme shift from the same pressure source.

A still further object of the invention is to provide mechanism whereby an operator may at will change the pitch of the blades to a feathered position and back to a propulsion position irrespective of whether or not the driving engine is operating.

Another object is to provide mechanism whereby the same source of power used for normal blade shift during controlled pitch operation can be used to effect additional movement both into and out of the extreme position.

Further objects and advantages of the present invention will be apparent from the following description, reference being had to the accompanying drawings wherein a preferred embodiment of the present invention is clearly shown.

In the drawings:

Fig. 3 is a transverse sectional view through the regulator mounting plate showing the basic elements of the fluid circuit, substantially as indicated by the line and arrows 3—3 of Fig. 1.

Fig. 8 is a detail in section as indicated by the line and arrows 8—8 of Fig. 3.

Fig. 9 is a detail view in section substantially as indicated by the line and arrows 9—9 of Fig. 1.

Figure 1:
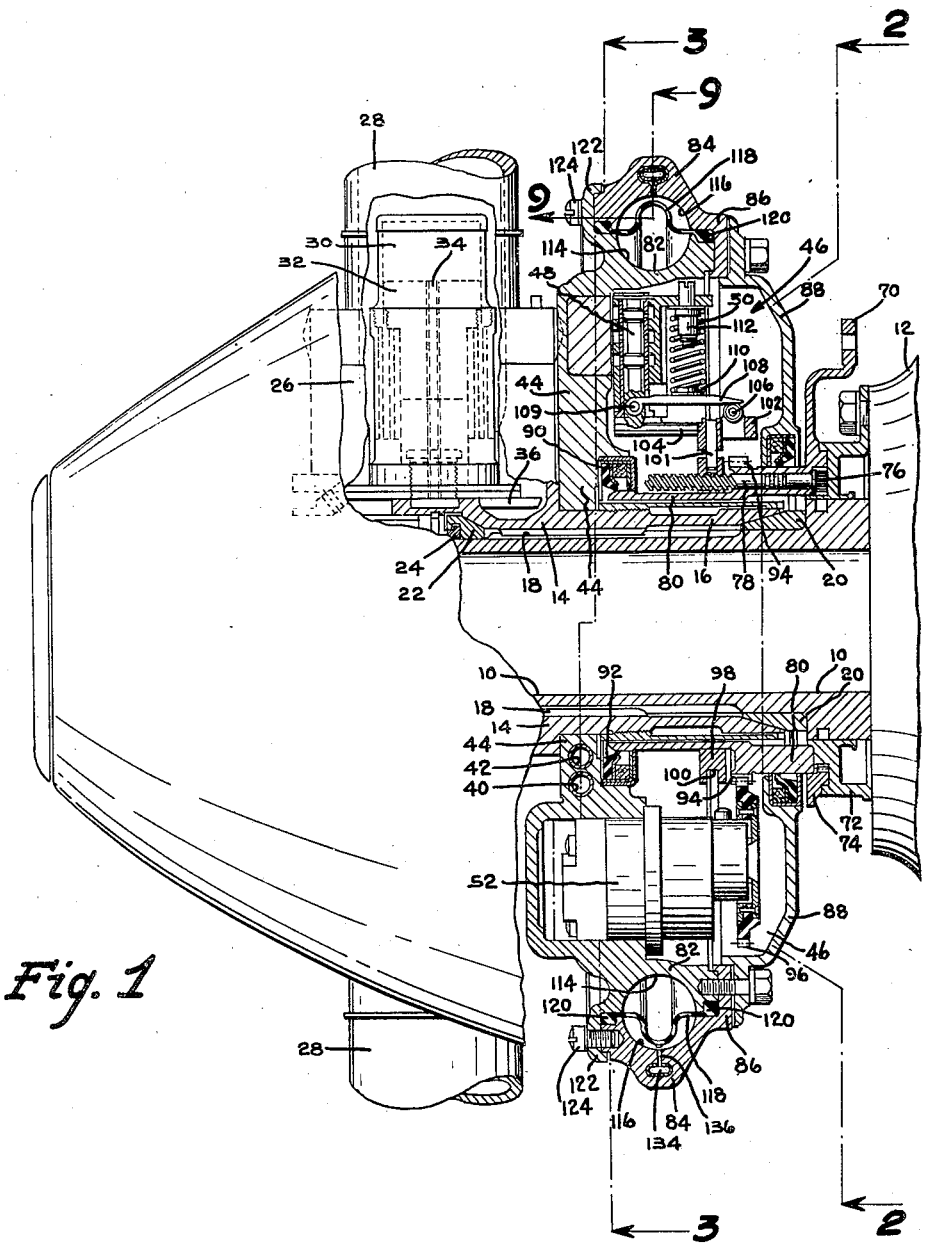
Fig. 1 is a side view of a propeller, with parts broken away to show a longitudinal section of the control mechanism involving the instant invention.

In aircraft, particularly those fitted with propellers of the controllable pitch type, it is sometimes desirable to change the pitch of the propeller blades to an extreme position or to one that is considerably outside of the normal or working range of the blades for propulsion purposes. This extreme position may be one in which the plane of the blade is substantially parallel with the airstream flowing over the craft or parallel to the line of aircraft motion, at which time the blade offers the least drag to motion of the craft through the air. That position or condition of the blade is sometimes referred to as the feathered position, or the sailing position, and again it is said to be the wind's eye position.

Where variable pitch blades are controlled automatically there is usually some dependence upon speed of rotation of the propeller, or some resultant function thereof that is a determining moment for accomplishing the shift, and therefore if the driving impulse for rotation of the propeller is disconnected from the propeller before the shift of pitch to the extreme position is made then there is an absence of efficient power to effect the desired extreme shift. That is because the engine, either by accident or intention, is dead at the time of the proposed shift, and there is insufficient fluid pressure to operate the servomotor.

It therefore becomes desirable to afford a reserve of power for moving the blades to the desired extreme position when the conventional fluid circuit is insufficient to provide the necessary motive force. It is also desirable to have the reserve of power available for moving the blades from the extreme position back to the normal range of operation. While the need for feathering of the propeller and unfeathering of it has its greatest import in the instance of multi-motored aircraft where one or more of the motors may for some reason become inoperative, it is of but little less adaptability in uni-motored installations for special maneuvering. A single example of such maneuvering is that of climbing to a high altitude remote from some objective, then cutting out the motor to convert it to a glider type aircraft by which it can be piloted a considerable distance almost silently, or with less likelihood of detection at a ground station. Arriving at the location of the objective, a charge of explosives might well be released upon a target before presence of the craft was in fact discovered. With the provision of the reserve energy for unfeathering the propeller blades, the return to normal or working range of pitch can be accomplished at will which makes it possible for the pilot to restart his engine by the windmill action of the propeller, and be on his return from the objective almost by the time his released projectiles have landed.

The instant invention accomplishes provision of mechanism for effecting the complete control of the blade shift within the working range, and movement of the blades to and from the extreme position, by building a self-contained hydraulic control unit that is mounted on and carried by the rotating propeller, each propeller having its own control unit working wholly independent of any other propeller, thus being adaptable to effect the desired control whether the craft be fitted or powered by one or several power plants. Specifically, in accomplishing the stated objects provision is made for a fluid control system wholly enclosed within a reservoir, which system includes a pump for developing fluid pressure that is led by a high-pressure line to a distributing valve that has manual means superimposed upon automatic means for determining the need of, and applying fluid pressures to, a servomotor or torque applying unit for shifting the blades. Aside from a relief valve to guard against excessive pressure in the system, a check valve for preventing return of pressure to the pump, and for maintaining pressure in the line, and a pressure reducing valve in the line between the pump and the distributor valve, there is a second check valve on the high pressure side of the pressure reducing valve that opens into an accumulator, and a by-pass around the second check valve in which by-pass there is a control valve that is manually operable to connect the reserve of fluid pressure in the accumulator to the distributor valve. The manual means of control superimposed upon the automatic control of the distributor valve for moving it to either extreme, also actuates the control valve of the by-pass, thereby connecting the reserve of pressure stored in the accumulator with the selected side of the servo-motor through the distributor valve. The foregoing is graphically shown in Fig. 10 of the drawings.

With reference particularly to Fig. 1, 10 indicates an engine shaft projecting from an engine housing 12, on which shaft there is mounted a propeller hub 14 by means of a sleeve 16 having a splined connection 18 with the shaft and seating against a rear cone 20 where it is held by a foreward cone 22 and shaft nut 24. The hub 14 provides radiating sockets 26 for shiftable mounting of blades 28 within the root of which there is a servo-motor or torque applying unit 30 adapted to rotate the blade on application of fluid pressure to either side of a piston member 32, fluid pressure being admitted by way of tubular passages 34, 36 and 38 communicating with appropriate distributing lines 40, 42. Designedly, the distributing lines are embedded in and form a part of a plate 44 comprising one wall of a regulator housing for enclosing the control mechanism and forming a reservoir 46 to be charged with a fluid medium.

Distribution of fluid pressure to one or another of the lines 40 or 42 is accomplished by a governor valve 48 so arranged as to be influenced by the centrifugal force of propeller rotation for connecting the line 40 with a source of pressure, and opposed by alterable spring means 50 for connecting the other line 42 with the same source of pressure. The source of pressure is created by means of a pump or pressure developing means 52 also mounted in the regulator plate 44 and having an intake 45 from the reservoir 46 which it discharges into a pressure line 54, 56. The portion 56 thereof leads to a supply port 58 of the governor valve 48 where it may be connected with either the port 60 leading to the line 40, or to the port 62 leading to the line 42, determined by the dominating force of the centrifugal actuation or spring actuation of the valve 48.

Manual actuation of the valve 48 may be superimposed upon that automatic operation by means of an outside controller 70 mounted for oscillation about a support ring 72 rigidly secured to the engine nose piece 12, which controller comprises a ring-gear 74 adapted to drive a plurality of pinions 76 each carried by a screw-shaft 78 mounted for rotation in an adapter sleeve 80. This sleeve is restrained against rotation with respect to the engine housing and projects into the reservoir 46 to end near the regulator plate 44 and form an inner circumferential wall of the reservoir, which with the other casing members 82, 84, 86 and 88 complete the reservoir 46 in the form of a hollow annulus. About the enclosed part of the sleeve 80 and at either end thereof where the sleeve is proximate to the wall members 44 and 88, annular fluid seals 90 and 92 are provided so as to be carried by the rotary parts and have sliding engagement with the fixed sleeve.

Carried by the enclosed portion of the sleeve 80 there is a gear 94 adapted to drive a pinion 96 of the pump 52 as the regulator is rotated about the sleeve. Slidable along the enclosed portion of the fixed sleeve 80 there is a control ring 98 actuated in response to oscillation of the ring 74 that drives the screw shafts 78. The control ring provides a groove 100 in which slides a shoe 101 of a fulcrum block 102 carried by arms or the like 104 extending from the governor mechanism. The fulcrum block provides a roller 106 supporting one end of a lever 108 pivotally attached at 109 to one end of the valve 48. The spring 50 seats at one end on a pad 110 about midway of the lever and at the other end on an adjustable pin 112 carried by the governor mechanism.

The adjustable pin 112 provides for factory adjustment of the spring 50 and consequently the speed response of the regulator mechanism, and is intended for calibration of the whole control mechanism with respect to a specific type of engine. However, the fulcrum block whose movement is effected by the controller 70 provides for superimposing the desires of the pilot upon the automatic control of pitch shifting. It may be used as a top limit for the speed range within which the automatic control will be operable. That is due to the fact that movement of the fulcrum block along the arms 104 operates to change the length of and the relation of the moment arms through which the centrifugal force and the spring force operate on the valve 48.

Figure 10:
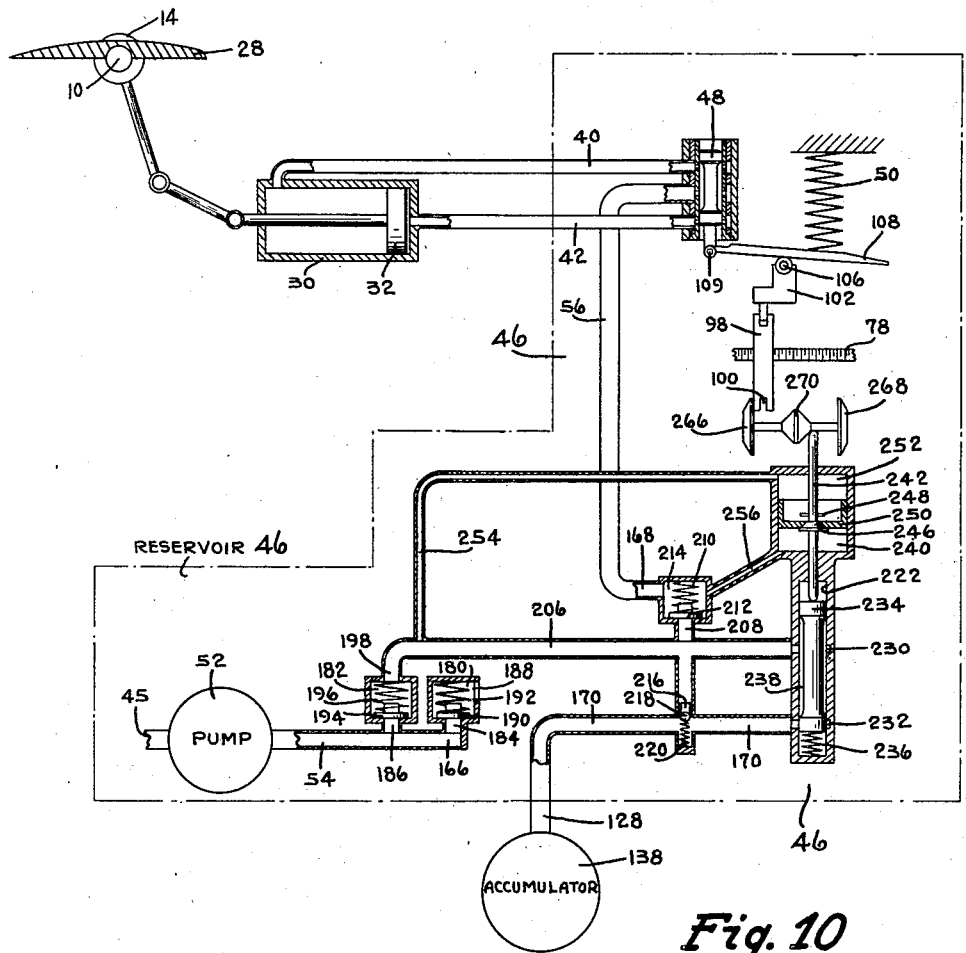
Fig. 10 is a flow chart showing the relation of the fluid circuits by which the control of movement of the blades into and out of the extreme position is effected.

Regarding the position of the parts as they are shown in Fig. 1, centrifugal force acting upon the lever operates through a moment arm substantially twice as long as the moment arm through which the spring force acts. It is readily seen that if the fulcrum block be moved inward toward the valve 48 that the moment arm for the spring is shortened much faster in proportion than is the moment arm for the centrifugal force. Due to that, centrifugal force of lower value will be operable to overcome the spring force in the new position, in consequence of which the top of the speed range for regulation is lower than for the illustrated position. For purposes of the instant invention the fulcrum block 102 may be moved toward the valve 48 until it is positioned between the spring seat 110 and the lever pivot 109 substantially as shown in Fig. 10. Under those conditions the spring 50 instead of opposing the centrifugal force will now act in assistance to it and cause the valve 48 to be thrown radially outward regardless of centrifugal force.

With respect to the other casing members 82, 84, 86 and 88 for completing the enclosure of the reservoir 46, the member 82 constitutes a flange on the bounding edge of the plate 44 and is provided with a peripheral groove 114 semicircular in cross-section and forming one wall of a toroidal accumulator that is completed by a cooperating groove 116 in cover ring 84, there being a flexible wall member 118 secured therebetween to provide an impervious partition. The flexible wall member 118 is in the form of a live rubber or rubber-like diaphragm, molded in the form of an endless band with thickened ribs 120 at either edge that cooperate with receiving grooves in the parts 82 and 84 for anchorage when the parts are secured together. The plate 44 is extended radially beyond the flange 82 to provide a rim 122 against which one edge of the member 84 seats and through which attaching screws 124 pass to threadedly engage the member 84.

Also molded as a part of the plate 44 there is one or more radially extending ribs 126 one of which has a cast-in tubular lining 128. A passage 130 opening into 128 is aligned with a passage 132 opening into an annular passage 134 provided by the member 84 and having a multiplicity of small openings 136 communicating with the groove 116. When the parts 82, 84 and 118 are properly assembled there is then formed an annular chamber surrounding the regulator structure that is circular in cross-section and has a resilient portion across it dividing the same into an expansion chamber 138 and a preloaded compression chamber 140. For preloading the chamber 140 the plate 44 is provided with a nipple and check valve 142 of the tire-valve type that fits into a threaded recess 144 and opens by means of a drillway 146 into the groove 114 of the flange 82, thereby making communication with the compression chamber 140. After assembly is complete, air forced into the chamber 140 expands the diaphragm 118 radially outward toward the surface of the groove 116 thereby acting as a spring means constantly applying its force to the content of the expansion chamber 138.

The expansion chamber 138 is in communication with the fluid circuit of the control system through the passages 136, 134, 132, 130 and tubular liner 128, the inner end of which is anchored in a mounting block 148 over which is secured a feathering control valve assembly 150. The block 148 also forms a support for the adjacent ends of the pipes 54 and 56 forming the pressure line between the pump 52 and governor valve 48. The block 148 is therefore embedded in the metal of the plate 44 so as to seal the ends of the tube elements 54, 56 and 128 in the relation shown in Fig. 3, with bores 152, 154, 156 opening into the tubes from the face of the block 148, the relation of which is indicated in Fig. 3 by the circles so marked.

Figure 2:
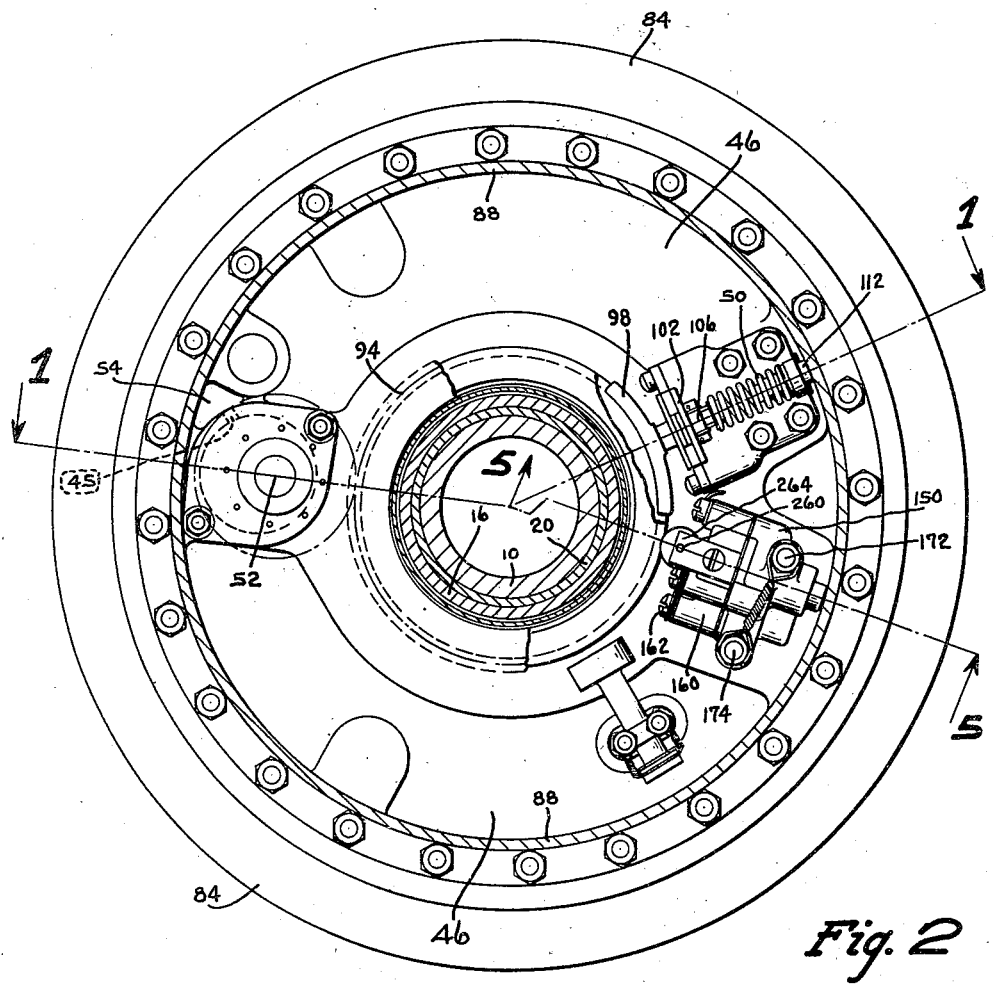
Fig. 2 is a transverse sectional view through the regulator mechanism substantially as indicated by the line and arrows 2—2 of Fig. 1.
Figure 4:
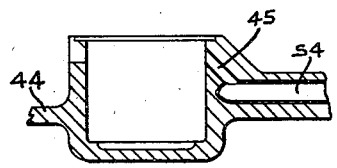
Fig. 4 is a fragmentary view in section through the pump mechanism substantially as indicated by the line and arrows 4—4 of Fig. 3.
Figure 5:
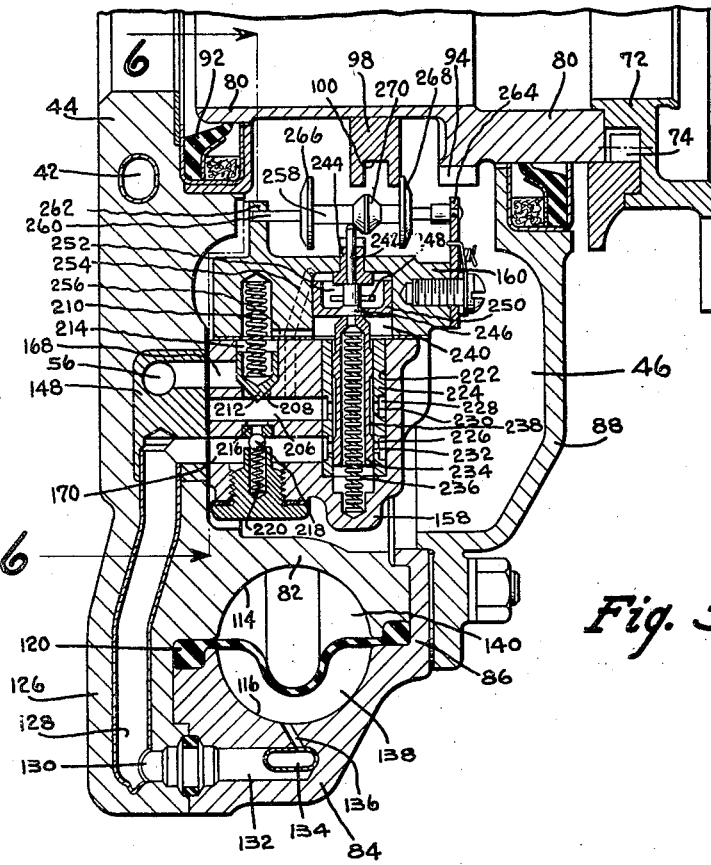
Fig. 5 is an enlarged view in section showing details of construction of the control valve mechanism substantially as suggested by the line and arrows 5—5 of Figs. 2 and 3.
Figure 7:
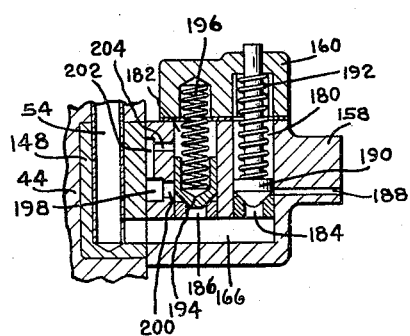
Fig. 7 is a sectional view through the valve unit substantially as indicated by the line and arrows 7—7 of Fig. 6.

The control valve assembly 150 operates to maintain a one-way fluid connection between the pump delivery passage 54 and 56 and provides an automatic means for charging the accumulator passage 138 with a reserve of fluid which under certain conditions may be admitted to the passage 56 in lieu of the fluid pressure from the passage 54. In its physical embodiment the valve assembly comprises a pair of blocks 158 and 160 secured together by screw devices 162 for housing the various valves and interconnected passages. The block 158 has a machined surface 164 for sealed mounting over the face of the block 148 and having ports 166, 168 and 170 located such as to line up with the ports 152, 154 and 156 respectively of the block 148 when the control valve assembly is mounted on the regulator plate 144 as indicated in Figs. 2, 5 and 7. The valve assembly is retained in proper position by screw devices 172 and 174 entering threaded holes 176 and 178 of the plate 44.

Figure 6:
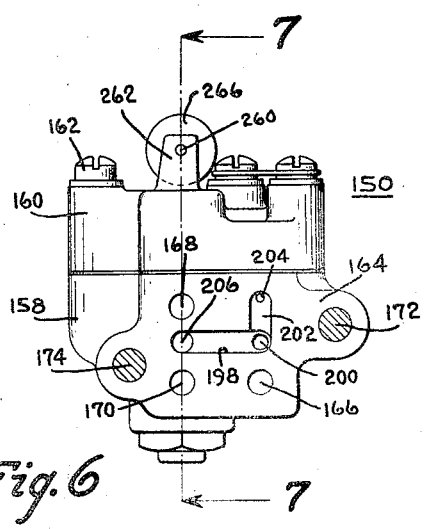
Fig. 6 is an elevational view of the mounting face of the valve unit substantially as indicated by the line and arrows 6—6 of Fig. 5.

Further detailed description of the control valve assembly and of the function of the parts thereof are best understood by reference to the illustrations in Figs. 5, 6 and 7, where it will be apparent that the port 166 is drilled of sufficient depth to nearly pass through the block 158 and from which there are laterally extending bores 180 and 182 fitted with port rings 184 and 186 respectively. From the bore 180 there opens a passage 188 that communicates with the exterior of the valve unit, it opening directly into the reservoir 46. Working within the bore 180 is a valve head 190 urged to seat against the port ring 184 by relatively firm spring 192, the structure thereby constituting a relief valve in communication with the pump supply passage 54 and operating upon development of extremely high pressure to allow relief of the system through the passage 188. Housed within the bore 182 is a valve cup 194 maintained in seating relation against the port ring 186 by a spring 196, it being materially weaker than the spring 192. Cut into the face 164 of the block 158 there is a recess 198, one end of which opens by means of passage 200 into the bore 182 at such a point that it will normally be closed by the valve cup 194. A branching recess 202 connecting with the recess 198 and opening into a bleed passage 204 also communicates with the bore 182 and operates to relieve that pressure that might otherwise hinder the opening of the valve cup 194.

The valve 194 operates as a check valve to prevent reverse flow of fluid through the pump supply passage whenever the system is opened to the reserve of pressure from the accumulator. The valve being under less spring pressure than that of the relief valve will readily open when pressure is applied to the passage 166 to permit the fluid pressure passing through the porting ring 186 and passages 200 and 198 from which it passes through a passage 206 shown in Figs. 5 and 6. From the passage 206 the fluid under pressure may move in either of two directions depending upon the pressure conditions of the system and the need for applying the pressure.

Moving in one direction from the passage 206 the fluid passes through a port 208 normally closed under pressure of a spring 210 by a valve member 212 housed in a bore 214 and into which opens the porting passage 168. Thus, the valve 212 occupies a position in the line of fluid transmission between the high pressure line 206 from the pump and the distributor valve 48, a circuit connection from the passage 206 being through the port 208 thence 168 to 56.

Moving in the second direction from the passage 206 fluid may pass through a porting passage 216 to lift a valve 218 under pressure of the spring 220 which admits the pressure to the porting passage 170 herein before described as communicating with the tubular passage 128 and by it to the expansion chamber 138 of the accumulator.

Also provided by the block 158 there is a cross-passage 222 so drilled as to intersect both passages 170 and 206, the cross passage being fitted with a porting sleeve 224 having peripheral grooves 226 and 228 each apertured for ports 230 and 232 respectively aligned with the passages 206 and 170. Movable within the porting sleeve is a control valve member 234 which is under the urge of a spring 236 normally to close the ports 230, but which provides an annular groove 238 adapted on depressed movement of the valve member to connect ports 230 and 232 and thereby passages 206 and 170. Therefore, when the valve 234 is depressed for connecting the passages 206 and 170, then the reserve of pressure in the chamber 138 of the accumulator is connected from the passage 128 through 170 and a by-pass around the charging check valve 218 and is directly applicable to the governor valve 48 through the ports 230, 232, 208, and passages 168 and 56.

The block 160 as shown provides a cover for the valve containing bores 180, 182, 214 and 222 and operates to house the respective springs. In closing off the valve bore 222 the block 160 also provides a chamber 240 housing mechanism capable of manual manipulation for depressing the valve 234. The depressing means comprises a headed pin 242 carried in a bushing 244 supported by the block member 160 and projecting into the chamber 240, such that its head 246 engages the end of the valve member 234 and operating upon longitudinal movement to depress the same against the spring 236. Through the rod 242 and spaced from the head 246 is a cross pin 248 adapted upon depression to engage the end wall of a piston member 250 slidable within the chamber 240. The opposite sides of the piston 250 are subjected to differentials of pressure since the upper portion of the chamber 252 is in communication by a passage 254 extending through the blocks 160 and 158 to the passage 206, and since the lower part of the chamber 240 is in communication by means of a groove 256 with the valve bore 214. The valve 212 and its associated spring 210 are of such characteristics as to cause a pressure drop between the passages 206 and 168 of about 20 lbs. per sq. inch, which differences of pressure by the means just stated is also applicable to the opposite sides of the piston 250 through the passages 254 and 256.

For the purpose of depressing the pin 242 at the option of an operator or pilot, a cam-bar 258 is supported on a rod 260 from a lug 262 and a clip 264 secured to the block 160. The rod 260 is relatively fixed and slidably carries the cam-bar 258. At each end of the cam-bar there is a flange 266 or 268 each of which is adapted to be engaged and moved by the control ring 98 whenever the ring is moved to either extreme of its limits along the adapter sleeve 80. At an appropriate point intermediate the flanges 266 and 268 a pair of cam faces 270 are provided and so adjusted with respect to the pin 242 that movement of the cam bar 258 along the rod 260 will cause the pin 242 to be projected through its guide member 244 and thereby depress the valve 234 against the spring 236. With reference to Fig. 5, it will be appreciated that the control ring 98 has been moved to that extreme that it engages the flange 268 and occupies a position substantially as indicated in Fig. 1 and under which conditions it may be assumed that the pitch of the blades has just been unfeathered or returned to the working range. Now if the control ring 98 be moved to the left at the other extreme as shown in Fig. 5, then the control ring 98 will engage the flange 266 and cause the bar 258 to be moved along the rod 260 which carries with it the cam faces 270 that depress the rod 242. As the rod 242 depresses the valve 234 and connects the passages 170 and 206 the cross bar 248 also engages and carries with it the piston 250 which when depressed is subjected to the high pressure in 206 by way of the passages 254 and under the influence of the reserve pressure in the chamber 138 through the passage 128, 170 and groove 138. That connection opens the reserve of pressure in the accumulator directly to the supply passage 56 through the port 208 and passages 168 and 154.

A description of operation can perhaps best be understood by referring to the flow chart shown in Fig. 10 where the elements of structure are shown in their simplest form and in their general functional relation. Presupposing that all parts of the mechanism have been properly calibrated and that the propeller mechanism is rotating, then it may be assumed for example that the pump 52 is delivering to the passage 54 a fluid medium under pressure which flows past the valve 194 to build up in the passage 206 a pressure head of say 820 lbs. per square inch. That same pressure head will be applied to the valve 218 feeding the accumulator, and against the pressure reducing valve 212 which by its preloading by the spring 210 reduces the pressure in the passage 56 leading to the governor valve 48 to 800 pounds per square inch. Thus, the governor valve 48 in moving in response to either centrifugal force or spring pressure may apply the fluid pressure of 800 pounds per square inch to either side of the torque applying unit by which the blades are shifted.

During the interim between movements of the valve 48 that is, while there is no flow of fluid through the governor valve there is a possibility, where a constant delivery pump is used, that the pressure in the passage 206 rise considerably higher than the 820 pounds per square inch, for which reason the relief valve 190 is provided for opening the pump delivery passage 54 to the reservoir whenever the pressure therein reaches an undesirable value, say 1000 pounds per square inch. Under those conditions the fluid pressure in any part of the system can never exceed the pressure of 1000 pounds per square inch, but whatever the pressure therein, the pressure reducing valve 212 will always reduce the pressure applied to the governor valve 48 and the torque applying units by something like 20 pounds, and the chamber 138 of the accumulator will be charged with a reserve of pressure in the neighborhood of the maximum pressure that has been developed in the passage 206. It suffices to assume that the pressure in the accumulator chamber slightly exceeds the proposed pressure of 820 pounds per square inch though it may reach 1000 pounds, the setting of valve 190.

Figure 11:
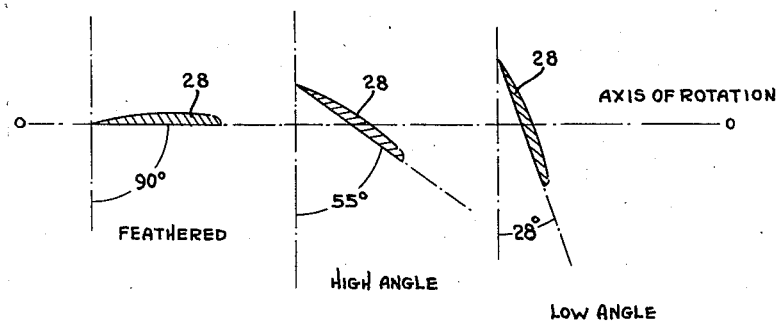
Fig. 11 is a graphic illustration of the controlled positions of propeller blade that may be effected by the instant invention.

Under those assumptions the mechanical elements of the governor valve will be in the relation illustrated in Fig. 1, in which the governor valve 48 maintaining a balance of forces between centrifugal force and spring force effects automatic adjustment of the blade pitch between the "high angle" and the "low angle" as suggested in Fig. 11. Of course the manual control 70 through the screw shafts 78 and control ring 98 make it possible to adjust the top limit of speed at which the governor mechanism will effect its automatic regulation, and also provides means whereby the automatic control by the governor valve 48 may be completely negatived or dispensed with. Such a superimposed control may be necessary or desirable and may be accompanied with the desire to move the blade setting to some extreme position outside of the working range, to say the "feathered" position illustrated in Fig. 11.

The extreme position for the blade setting may be accomplished by moving the control ring 98 to the extreme low speed position, whereupon it will move the fulcrum 106 along the lever 108 to a position on the opposite side of the spring 50 as shown in Fig. 10. In that position the spring 50 will be in aiding relation to the centrifugal force acting upon the valve 48 and the latter will be moved outwardly to connect the pressure supply passage 56 with the control passage 40, the return from the torque applying unit being through the control passage 42. With the governor valve 48 subjected to the stated conditions, the torque applying unit is then exposed to the full force and effect of the fluid pressure delivered to the supply passage 56 for moving the blade setting to the extreme position.

Coincident with movement of the control ring to either extreme position the reserve of pressure stored in the accumulator is made available as a continuing force applied to the pressure supply passage 56, and when in the extreme position illustrated in Fig. 10, is available for moving the blade setting to the fully feathered position. That movement of the control ring engages and carries with it the cam member 270 which depresses the rod 242 and with it the control valve 234. Downward movement of the rod 242 also opens communication between opposite sides of the dashpot piston 250 and thence moves it downwardly along with the valve 234. Passing of the cam 270 will allow retraction in part of the valve 234 under influence of the spring 236, but only so far as to permit the head 246 to again seat against the piston 250. When the piston 250 is first moved downwardly, pressures on the opposite sides thereof are substantially equalized through disengagement of the head 246 and piston 250. However, reclosing of the port by the head 246 is effected by the spring 236 as soon as the crest of the cam 270 passes the end of the rod 242 and the piston is thence subjected to the differences of pressure determined by the pressure reducing valve 212.

Directly that the governor valve 48 is moved to the extreme position there is a material relief of the sustained pressure in the passage 168 and consequently on the underside of the dashpot 250, but coincidently therewith the passage 206 is opened to the pressure potential of the reserve of pressure in the accumulator which is 820 pounds per square inch or more and finds its way by the passage 254 to the upper side of the dashpot piston 250. The greater pressure in 252 tends to maintain the piston in the actuated position and consequently the control valve in a position to keep the port 230 open long enough for movement of the blade to the feathered position. When the blades reach the extreme position, and there is no further movement of the torque applying unit possible, the pressure in the passage 56 tends to build up somewhat until the differential determined by the pressure reducing valve 212 is obtained. The characteristics of the spring 236 are such that with its force added to the low pressure side of the piston 250, those forces will be sufficiently greater than the potential of the high pressure side to cause a gradual return of the control valve and plunger. That return closes the port 230 soon after the blades reach the extreme setting, and the remainder of the reserve of fluid pressure is kept trapped in the accumulator and available for further application to the pressure supply passage, such as for moving the blade back to a position within the normal working range, or in the neighborhood of the "high angle" setting shown at the center of Fig. 11.

Unfeathering of the blade, or returning it to the normal range of pitch setting is accomplished by the same mechanism and fluid pressure source. It will be appreciated that when the blade is set in the position of "feather," as shown in Fig. 11, that the propeller offers the least possible resistance to movement of air thereover and that there is no component of force tending to rotate the propeller. The engine coupled with the propeller will under those conditions be non-operative but may be cranked by shifting the blade setting to the "high angle" position whereupon the propeller will windmill and turn the engine sufficient to start it. To unfeather the propeller, the manual control 70 is actuated to the other extreme which through the agency of the control ring 98 moves the fulcrum 102 to its normal position as shown in Fig. 1, and reconditions the governor valve for automatic control of the torque applying units directly that the propeller becomes engine driven. That position is the high speed position of the governor, but since the speed of propeller rotation is then far below the adjusted governing speed the governor valve 48 will have a position radially inward of the governing position due to the force of spring 50 everbalancing the effect of any centrifugal force influencing the valve 48. Thus, the pressure supply passage 56 is in direct communication with the control passage 42 and the torque applying unit has its return through the control passage 40.

In returning the fulcrum to the extreme high speed position the control ring 98 has shifted the cam 270 to the right, as viewed in Fig. 11, causing the plunger 242, the control valve 234 and the piston 250 to be depressed as has hereinbefore been described. That depression of the control valve reconnects the accumulator with the supply passage 56 so that the remainder of the reserve of pressure is now available for actuation of the torque applying units. Since the opposite chambers of the torque applying units are now connected to the reserve of fluid pressure the blade movement is in the reverse direction to that for feathering. When the return of the blades to the working range of setting is effected the dashpot acting as before stated in response to the opposing pressures and the force of the spring 236 permit the control valve to again close thus saving some of the reserve of fluid pressure in the accumulator for refeathering of the propeller should there be need for the same before regeneration of the accumulator by propeller operation could be had. Directly that the engine becomes self-operative, it gathers speed and the pump 52 begins to regenerate the charge of reserve pressure in the accumulator. During the while the governor valve takes up its duties of automatically controlling the setting of the blade pitch.

While the embodiment of the present invention as herein disclosed, constitutes a preferred form, it is to be understood that other forms might be adopted, all coming within the scope of the claims which follow.

What is claimed is as follows:

1. A propeller control mechanism of the character described for use with an hydraulically adjustable propeller having provision for effecting adjustment of the pitch of the propeller blades upon the application of fluid pressure thereto comprising a propeller hub, a housing rotatable with said propeller hub, a relatively stationary member projecting into said housing, means providing a reservoir within said housing for receiving a quantity of fluid pressure medium, pump means within said housing and operative upon relative rotational movement between said housing and stationary member to provide a source of said fluid under pressure, means within said housing for limiting the action of said pump means after the establishment of a predetermined pressure, means to maintain a supply of said fluid under said condition of predetermined pressure available for use as a reserve source of pressure operating fluid, means responsive to the speed of rotation of said propeller for selectively controlling the application of said pressure operating fluid to maintain a predetermined speed of operation, means continuously operable for varying the action of said controlling means to cause the same to respond to different predetermined speeds, and means operable continuously during either operation of or quiescence of the propeller for suppressing the varying action of the controlling means, and for selectively applying the full force of said reserve source of pressure operating fluid to said pitch adjusting provisions.

2. A propeller control mechanism of the character described for use with an adjustable blade propeller having fluid actuated means for effecting change in the pitch of the blades, comprising a housing rotatable with the propeller shaft, a relatively stationary member projecting into said housing, means providing a sealed reservoir within said housing for receiving a quantity of fluid pressure medium, pump means within said housing and having an inlet in communication with said reservoir toward the outer periphery thereof, means for actuating said pump means upon relative rotational movement between said stationary member and said housing to provide a source of said fluid under pressure, valve means responsive to the development of a predetermined pressure by said pump means to automatically limit the further supplying of pressure by said pump while a predetermined pressure exists, means for storing up pressure in excess of that required for blade pitch change for providing a reserve of fluid pressure, a regulator valve member within said housing responsive to the speed of rotation for selectively controlling the application of said predetermined pressure to said fluid actuated means to effect change of pitch of the propeller blades, and means continuously operable for varying the action of said regulator valve to cause the same to respond to different predetermined speeds, and also operable for negativing the control action of said regulator valve and applying the full force and effect of said reserve of fluid pressure in lieu thereof.

3. A propeller control mechanism of the character described for use with an adjustable blade propeller having fluid actuated means for effecting change in the pitch of blades, comprising a housing rotatable with the propeller shaft forming a sealed self-contained reservoir for operating fluid, pump means within said housing, a discharge passage into which said pump means discharges, means for effecting positive operation of said pump means upon rotation of said propeller to provide sustained fluid pressure in said discharge passage, a governor valve within said housing and directly responsive to centrifugal force for selectively controlling the application of said fluid pressure to said fluid actuated means to effect change of pitch of the blades, means in said housing and in communication with the discharge passage for limiting the maximum of fluid pressure delivered to the governor valve, accumulator means for storing the fluid pressure in excess of the pressure required by said fluid actuated means as a reserve fluid pressure, means continuously exposed to the discharge of said pump for opening the discharge passage to said accumulator means whenever the fluid pressure in said discharge passage is in excess of the reserve pressure, and means continuously operable for controlling the application of the reserve fluid pressure to said fluid actuated means in lieu of the limited fluid pressure.

4. A propeller control mechanism of the character described for use with an adjustable blade propeller having fluid actuated means for effecting change in the pitch of blades, comprising a source of fluid pressure, a governor valve body mounted for rotation with said propeller and directly responsive to centrifugal force, means for supplying the pressure fluid under the control of said governor valve body to said fluid actuated means to cause change in the pitch angle setting of the propeller blades, resilient means acting with a substantially constant force irrespective of the speed of said propeller for opposing the action of centrifugal force on said valve body with a predetermined regulated force, a lever for applying the force of said opposing means to be effective upon said valve body, means for limiting the pressure of said fluid normally supplied to said governor valve for effecting the change in pitch angle setting, means for storing pressure as a reserve of fluid pressure to be constantly available, an adjustable control operable from the exterior of said rotating propeller for varying the effective moment arm of said lever, and means selectively operable by said adjustable control for negativing the response of said governor valve to centrifugal force and for supplying the reserve of fluid pressure directly to the said fluid actuated pitch changing means in lieu of the limited pressure fluid normally supplied thereto.

5. A propeller unit for an aircraft having a predetermined rotative speed, an independent fluid system wholly within said unit, speed responsive means in said system to maintain said predetermined propeller speed by varying the pitch of said propeller blades within a normal range, means for exerting pressure upon the medium of said fluid system and including a pressure passage leading to said speed responsive means, valve means exposed to said pressure passage for storing up a reserve of fluid pressure during normal operation of said pressure exerting means, manual means operable to overcome the speed responsive means and effect a selected shift of said blades within the normal range, and means selectively operable in conjunction with said manual means for applying the reserve of pressure to shift the pitch of propeller blades to a feathered position, and further selectively operable for applying the reserve of pressure to shift the pitch of propeller blades from the feathered position to a pitch within the said normal range.

6. A variable pitch propeller comprising a hub having blades thereon that are angularly adjustable throughout a normal working range between a low pitch position and a high pitch position and also movable to an extreme position without the normal range, torque applying units in each of the blades for controlling the adjustment of the blades, means dependent upon the speed of rotation of the propeller for automatically controlling the torque applying units to adjust the blades within said normal range, manually operated means for effecting control of the torque applying units independent of the speed responsive means, fluid pressure developing means for supplying a fluid medium under pressure to said speed responsive means and torque applying units, means for creating a reserve of fluid pressure while the propeller is operating, and means set into operation by a predetermined movement of said manually operated means for applying the reserve of fluid pressure to said torque applying means to move the blades to a position outside of and back into said normal range.

7. A variable pitch propeller comprising a hub having blades thereon that are angularly adjustable throughout a normal working range between a low pitch position and a high pitch position and also movable to an extreme position without the normal range, torque applying units for controlling the adjustment of the blades, means dependent upon the speed of rotation of the propeller for automatically controlling the torque applying units to adjust the blades within said normal range, manually operated means for effecting control of the torque applying units independent of the speed-responsive means, fluid pressure developing means for supplying a fluid medium under pressure to said speed responsive means and torque applying units, means for limiting the maximum of fluid pressure supplied to the speed responsive means by said fluid pressure developing means, means for segregating pressure fluid delivered in excess of the pressure demanded by normal blade shifting as a reserve of fluid pressure, and means constantly under control of said manually operated means for supplying said reserve of fluid pressure to the torque applying units in lieu of said limited pressure for moving the blades to and from the extreme position.

8. A controllable pitch propeller having in combination a hub carrying movably mounted blades, fluid pressure actuated means including torque applying units for moving said blades, a governor for controlling the pitch of said blades within a range between predetermined high and low pitch settings, fluid pressure developing means for said torque applying units and governor, means independent of the governor constantly operable for moving the blades to a pitch setting outside of said range, and for returning the blades to a pitch setting within said range, said last named means comprising a valve unit for limiting the fluid pressure applied to said torque applying units by said governor, means creating a reserve of fluid pressure from the excess above that needed by the torque applying units, and means actuated in response to predetermined operation of the independent means for exposing the torque applying units to said reserve of fluid pressure.

9. A controllable pitch propeller having in combination, a hub carrying angularly movable blades, torque applying units for moving said blades, fluid pressure means for actuating the torque applying units and including a governor valve for controlling the movement of said blades in accordance with the speed of rotation, pressure developing means for delivering a fluid medium under pressure to said governor valve, and a valve assembly subjected to the delivery of said pressure developing means for limiting the maximum of fluid pressure delivered to the governor valve by said pressure developing means, means for storing the pressure developed in excess of that used by the torque applying units as a reserve of fluid pressure, and means including a part of said valve assembly for substituting at will the reserve of fluid pressure for the said limited pressure.

10. A variable pitch propeller having blades adjustable about their axes, a torque applying unit for actuating each blade, a fluid pressure system for operating the torque units to increase or decrease the pitch setting of the blades, and including constant delivery fluid pressure developing means, a pressure supply passage communicating with the pressure developing means, speed responsive means connected with said pressure supply passage for applying the fluid pressure of said system to said torque applying units to adjust the pitch setting of the blades in accordance with speed, means connected with the pressure supply passage for establishing a reserve of fluid pressure, manually operated means for negativing the control by the speed responsive means, and means including a normally closed valve operable by said manually operated means for subjecting the torque units to said reserve of fluid pressure.

11. In a fluid pressure actuated system of control for varying the pitch setting of propeller blades within a predetermined range of movement, and having fluid pressure developing means for circulating a fluid pressure medium through a pressure supply passage to a pressure distributing unit, and an accumulator for storing a reserve of fluid under pressure, the combination with said pressure supply passage of a valve assembly exposed to the pressure of fluid in said passage and comprising, a pressure relief valve for limiting the pressure applied to said passage by said pressure developing means, a check valve for preventing reverse flow of pressure fluid to said pressure developing means, a pressure reducing valve for producing a pressure drop in the passage between the pressure developing means and the pressure distributing unit, an accumulator feeder valve open to the supply passage at a point between the check valve and the reducing valve, a normally closed fluid shunt around the feeder valve, a manually operated control valve for opening the fluid shunt at will, and means delaying the closing of said control valve until the supply passage has been exposed to the full force of the accumulator.

12. In a fluid pressure actuated system of control for varying the pitch setting of propeller blades within a predetermined range of movement, and having fluid pressure developing means for circulating a fluid pressure medium through a pressure supply passage to a pressure distributing unit, the combination with said pressure supply passage of manual means for disrupting the normal action of the distributing unit, an accumulator providing for storage of a reserve of fluid pressure constantly available, a valve assembly open to said passage and providing a pressure drop between the pressure developing means and the distributor valve, a feeder valve exposed to the high pressure side of said passage for charging said accumulator and for preventing reverse flow thereto, a valve controlled passage for circumventing said feeder valve to connect the reserve of fluid pressure to said pressure supply passage at will, and means coacting with the disruption of said distributing unit for opening the valve controlled passage.

13. In a fluid pressure actuated variable pitch propeller having a fluid pressure source, and a governor valve for automatically controlling the movement of the blades between predetermined high and low pitch setting, the combination comprising, means for storing up a reserve of fluid pressure during governed control of the blade setting, means for negativing the governed control of blade setting, and valve means selectively operable upon negativing of the governed control for applying said reserve of fluid pressure for effecting movement of the blades to a full feathering position.

14. The combination set forth in claim 13, wherein said selectively operable means includes a control valve, a dash pot exposed to a pressure drop in the fluid pressure source, and a cam for actuating the control valve.

15. In a fluid pressure actuated variable pitch propeller having a fluid pressure source, and a governor valve for automatically controlling the movement of the blades between predetermined high and low pitch settings, the combination comprising, means for storing up a reserve of fluid pressure during governed control of the blade setting, means constantly operable for selectively rendering the governed control operable and nonoperable, valve means selectively operable upon rendering the governed control of blade setting nonoperable for applying said pressure source for effecting movement of the blades to full feathering position, and valve means selectively operable upon rendering the governed control of blade setting operable for applying said pressure source for moving said blades to an unfeathered position.

16. In a fluid pressure actuated variable pitch propeller having a fluid pressure source, and a governor valve for automatically controlling the movement of the blades between predetermined high and low pitch setting, the combination comprising, means for storing up a reserve of fluid pressure during governed control of the blade setting, means constantly operable for relatively rendering the governed control operable and nonoperable, means selectively operable upon rendering the governed control of blade setting nonoperable for effecting movement of the blades to full feathering position, and means selectively operable upon rendering the governed control of blade setting operable for moving said blades to an unfeathered position, said selectively operable means for feathering and unfeathering the blades comprising a valve assembly in fluid connection with said pressure source adapted normally to prevent return flow to said source from the reserve of fluid pressure, a shunt passage returning the reserve of fluid pressure to the fluid pressure source, a control valve normally closing said shunt passage and operable to connect the reserve of pressure to the fluid pressure source, and a cam selectively movable by the constantly operable means for actuating the control valve to permit fluid movement through the shunt passage.

17. A fluid actuated controllable pitch propeller, comprising, torque applying units for moving the blades, a governor valve for determining the amount and direction of blade movement, pressure developing means having a pressure supply passage for delivering a fluid medium under pressure to said governor valve, means for storing a reserve of fluid pressure while the propeller is rotating, means for controlling the governor valve automatically in accordance with operating condition of the propeller, manually actuated means for superimposing a pilots control upon the automatic control means, and valve means exposed to the pressure supply passage and adapted to be set into operation by the manually actuated means for applying the reserve pressure to the torque applying units to move the blades to either a feathered pitch setting or an unfeathered pitch setting.

18. A propeller control mechanism of the character described for use with an adjustable blade propeller having fluid actuated means for effecting change in the pitch of the blades comprising, a sealed housing rotatable with said propeller and adapted to contain a quantity of operating fluid, means within said housing for subjecting said fluid to pressure, a governor valve body mounted within said housing for rotation with the propeller hub and directly responsive to centrifugal force, and a plurality of control passages communicating separately with said hub, means for limiting the maximum pressure to which the fluid is subjected, means for reducing the pressure of fluid admitted to the control passages, means for storing a reserve of the maximum fluid pressure, means in said hub selectively responsive to application of the reduced fluid pressure to one or the other of said passages to cause increase or decrease in the pitch angle setting of the propeller blade, means cooperating with said governor valve body for effecting the application of fluid under reduced pressure in response to change in speed of rotation of the propeller to one or the other of said control passages with concurrent discharge of pressure fluid from the other of said passages back to said housing, means for negativing at will the action of the cooperating means on said valve body to maintain continued application of reduced fluid pressure to a selected control passage; irrespective of the speed of rotation of said propeller and means operable coincidentally with the negativing means; to thereby apply the reserve of pressure to the selectively responsive means of the propeller blades to effect a pitch change of the blades to the feathered position.

JOHN F. HAINES.
THOMAS B. MARTIN.